United States Patent
Masin et al.

(10) Patent No.: US 11,574,244 B2
(45) Date of Patent: Feb. 7, 2023

(54) STATES SIMULATOR FOR REINFORCEMENT LEARNING MODELS

(71) Applicant: International Business Machines Corporation, Armonk, NY (US)

(72) Inventors: Michael Masin, Haifa (IL); Alexander Zadorojniy, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 16/568,284

(22) Filed: Sep. 12, 2019

(65) Prior Publication Data

US 2021/0081829 A1 Mar. 18, 2021

(51) Int. Cl.
*G06N 20/00* (2019.01)
*G06K 9/62* (2022.01)

(52) U.S. Cl.
CPC ............ *G06N 20/00* (2019.01); *G06K 9/6256* (2013.01); *G06K 9/6297* (2013.01)

(58) Field of Classification Search
CPC ...... G06K 9/6256; G06K 9/629; G06N 5/003; G06N 7/005; G06N 20/00; G06N 3/08
See application file for complete search history.

(56) References Cited

U.S. PATENT DOCUMENTS

| | | | |
|---|---|---|---|
| 9,128,739 B1 * | 9/2015 | Juels | G06F 9/5072 |
| 10,282,662 B2 | 5/2019 | Schaul et al. | |
| 2010/0333167 A1 * | 12/2010 | Luo | H04L 63/1441 706/14 |
| 2018/0012137 A1 | 1/2018 | Wright et al. | |
| 2020/0065157 A1 * | 2/2020 | Nag | G06N 3/02 |
| 2020/0175367 A1 * | 6/2020 | Shafto | G06N 3/0472 |
| 2021/0004682 A1 * | 1/2021 | Gong | G06N 3/08 |
| 2021/0397859 A1 * | 12/2021 | Arora | G06T 7/74 |

OTHER PUBLICATIONS

Volodymyr Mnih et al., "Playing Atari with Deep Reinforcement Learning", arXiv, Dec. 19, 2013.
Joshua Joseph et al., "Reduced-Order Models for Data-Limited Reinforcement Learning", 2011.
Yom-Tov et al., "Cumulative Success-Based Recommendations for Repeat Users", 2018.

* cited by examiner

*Primary Examiner* — Congvan Tran
(74) *Attorney, Agent, or Firm* — Ziv Glazberg

(57) ABSTRACT

A method, apparatus and a product for generating a dataset for a reinforcement model. The method comprises obtaining a plurality of different subsets of the set of features; for each subset of features, determining a policy using a Markov Decision Process; obtaining a state comprises a valuation of each feature of the set of features; applying the plurality of policies on the state, whereby obtaining a plurality of suggested actions for the state, based on different projections of the state onto different subsets of features; determining, for the state, one or more actions and corresponding scores thereof based on the plurality of suggested actions; and training a reinforcement learning model using the state and the one or more actions and corresponding scores thereof.

16 Claims, 4 Drawing Sheets

US 11,574,244 B2

STATES SIMULATOR FOR REINFORCEMENT LEARNING MODELS

TECHNICAL FIELD

The present disclosure relates to reinforcement learning models in general, and to generating training dataset therefor, in particular.

BACKGROUND

Reinforcement learning may be an area of machine learning concerned with how software agents ought to take actions in an environment so as to maximize some notion of cumulative reward. Reinforcement learning may be one of three machine learning paradigms, alongside supervised learning and unsupervised learning. Reinforcement learning may differ from supervised learning in that labelled input/output pairs need not be presented, and sub-optimal actions need not be explicitly corrected. Instead, the focus is finding a balance between exploration (of uncharted territory) and exploitation (of current knowledge).

Reinforcement algorithms may incorporate deep learning in order to achieve progress such as beating the human world champion at the game of Go as well as human experts playing numerous Atari video games.

BRIEF SUMMARY

One exemplary embodiment of the disclosed subject matter is a method comprising: determining a plurality of subsets of features, each of which is a subset of a set of features, whereby obtaining a plurality of different subsets of the set of features; for each subset of features of the plurality of subsets of features, determining a policy, wherein the policy is a function defining an action based on valuation of the subset of features, wherein the policy is determined using a Markov Decision Process (MDP), whereby obtaining a plurality of policies; obtaining a state, wherein the state comprises a valuation of each feature of the set of features; applying the plurality of policies on the state, whereby obtaining a plurality of suggested actions for the state, based on different projections of the state onto different subsets of features; determining, for the state, one or more actions and corresponding scores thereof based on the plurality of suggested actions; and training a reinforcement learning model using the state and the one or more actions and corresponding scores thereof.

Another exemplary embodiment of the disclosed subject matter is a computer program product comprising a non-transitory computer readable storage medium retaining program instructions, which program instructions when read by a processor, cause the processor to perform: determining a plurality of subsets of features, each of which is a subset of a set of features, whereby obtaining a plurality of different subsets of the set of features; for each subset of features of the plurality of subsets of features, determining a policy, wherein the policy is a function defining an action based on valuation of the subset of features, wherein the policy is determined using a Markov Decision Process (MDP), whereby obtaining a plurality of policies; obtaining a state, wherein the state comprises a valuation of each feature of the set of features; applying the plurality of policies on the state, whereby obtaining a plurality of suggested actions for the state, based on different projections of the state onto different subsets of features; determining, for the state, one or more actions and corresponding scores thereof based on the plurality of suggested actions; and training a reinforcement learning model using the state and the one or more actions and corresponding scores thereof.

Yet another exemplary embodiment of the disclosed subject matter is a computerized apparatus having a processor and coupled memory, the processor being adapted to perform the steps of: determining a plurality of subsets of features, each of which is a subset of a set of features, whereby obtaining a plurality of different subsets of the set of features; for each subset of features of the plurality of subsets of features, determining a policy, wherein the policy is a function defining an action based on valuation of the subset of features, wherein the policy is determined using a Markov Decision Process (MDP), whereby obtaining a plurality of policies; obtaining a state, wherein the state comprises a valuation of each feature of the set of features; applying the plurality of policies on the state, whereby obtaining a plurality of suggested actions for the state, based on different projections of the state onto different subsets of features; determining, for the state, one or more actions and corresponding scores thereof based on the plurality of suggested actions; and training a reinforcement learning model using the state and the one or more actions and corresponding scores thereof.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
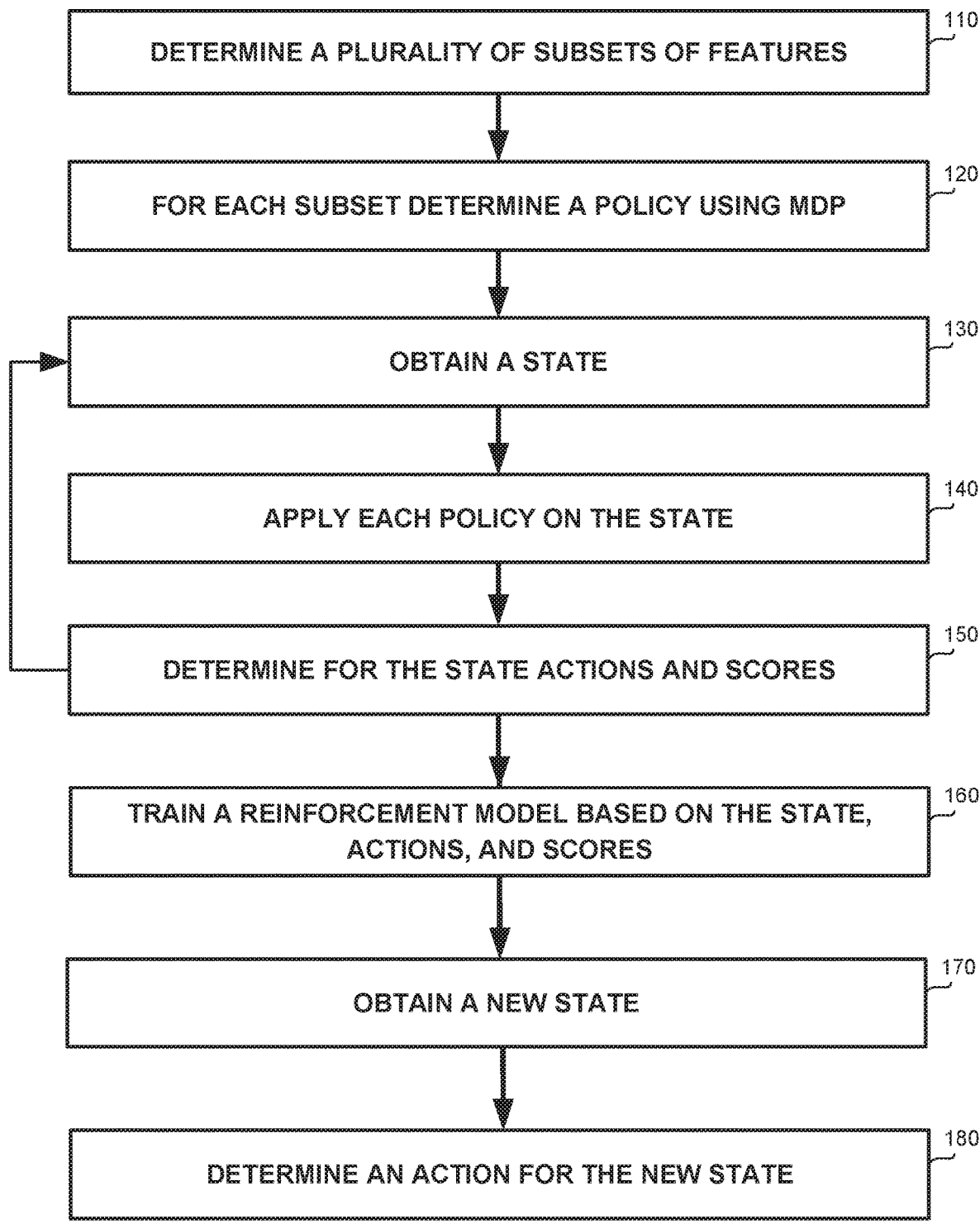
FIG. 1 shows a flowchart diagram of a method, in accordance with some exemplary embodiments of the disclosed subject matter.

One technical problem dealt with by the disclosed subject matter is to obtain a dataset that is large enough for training a Deep Reinforcement Learning (DRL) model. In some exemplary embodiments, a Markov Decision Process (MDP) may be applied on a dataset in order to determine a policy for each state, which may be used to train the DRL. However, in case the dataset is relatively large, such as defined by more than 200 features with millions of states, MDP may not be practical. In some exemplary embodiments, applying MDP on the dataset may be time consuming. Additionally or alternatively, applying the MDP on the dataset may consume computational resources. In some cases, applying the MDP on a commonly used hardware may be impractical.

Another technical problem dealt with by the disclosed subject matter is that it may be desirable to train a DRL based on a large dataset comprising states. Once trained, the DRL model may be utilized in order to provide an action for a state that may be obtained in a production environment. In some cases, the DRL may provide an action for a state. However, in order for the DRL to provide an action for a production state, the initial dataset may need to be very large, such as comprising at least 1 million states, 5 million states, or the like. Obtaining a large enough dataset may not be feasible in some use cases. Additionally or alternatively, obtaining a large enough dataset may consume a large amount of resources and may hold back the use of a DRL model in a production environment, until such model is mature, which may take too much time. As an example, in case of a board game such as Chess or Go it may be possible to configure a computer to play the entire set of possible boards. However, in real life systems such as recommendation systems, a robotic trainer, or the like, the size of possible theoretical states may be too large for a computer, or for several computers, to determine a large enough dataset.

Yet another technical problem dealt with by the disclosed subject matter is to provide a recommendation system. The recommendation system may be configured to recommend an action for a user based on the user's current state and based on a context. In some exemplary embodiments, a context may comprise states of objects that are external to the user. Additionally or alternatively, the context may comprise conditions, constraints, or the like, that are external to the user and affects him. As an example, the state of the user may be that the user is on a trip, looking for a recommendation regarding a place to go to. Additionally or alternatively, the state of the user may comprise his location, the amount of money that the user is willing to spend, purchase history, current time, current time of day, current time of week, weather conditions, opening hours of points of interest, or the like. An action may be to go to a museum, go to a park, go for shopping, or the like. Additionally or alternatively, the action may be to purchase a specific item from an inventory of many items.

Yet another technical problem dealt with by the disclosed subject matter is to scale the execution of MDP. In some exemplary embodiments, it may be desired to execute an MDP, or to find alternatives to MDP that may be scaled on more than one machine. Such scaling may reduce computation time of MDP and may accelerate the time that is needed in order to prepare a training dataset for RDL using MDP.

One technical solution is to divide a set of features into a plurality of subsets. On each subset, an MDP may be applied. Applying an MDP on a subset of features may yield a policy for the subset. Applying MDPs on a portion of the plurality of subset may yield a set of policies. In some exemplary embodiments, a policy may be a function that defines an action based on a state. In some exemplary embodiments, a state may comprise a valuation of features.

In some exemplary embodiments, there may more than 100 features, more than 200 features, more than 1000 features, or the like. Additionally or alternatively, each subset may comprise 5 features, 10 features, 20 features, or the like.

In some exemplary embodiments, dividing the set features to subsets may be performed randomly. In some exemplary embodiments, the features comprised by each subset may be determined randomly. Additionally or alternatively, the size of each subsets may be determined randomly, such as a random size within a predetermined range.

In some exemplary embodiments, the plurality of subsets may comprise the set of features, yielding that a unification of the subsets comprised by the plurality of subsets is the set of features. In some exemplary embodiments, each feature may be included in at least one subset, in at least two subsets, or the like. In some exemplary embodiments, a feature may be comprised by more than one subset. In some exemplary embodiments, two subsets may have a non-empty intersection therebetween.

In some exemplary embodiments, a state may be obtained and a portion of the policies comprised by the plurality of policies may be applied on the state, yielding a plurality of suggested actions for the state. In some exemplary embodiments, a suggested action may be associated with a score. The score of the suggested action may be based on the frequency of the suggested action. One suggested action may have a first score and a second suggested action may have a second score. The first score may be higher than the second score in case that the frequency of the first suggested action is higher that the frequency of the second suggested action.

In some exemplary embodiments, an action for the state may be determined. The action may be determined by choosing the suggested action with the highest frequency. In some exemplary embodiments, more than one suggested action may be chosen. A threshold may be determined and suggested actions having a frequency above the threshold may be determined as actions, allowing to discard suggested action that may be outliers.

In some exemplary embodiments, a state may correspond to more than one action. In some exemplary embodiments, the state and one or more actions may be provided to the reinforcement learning model, such as for learning purposes. As an example, a user may be in London and the chance for a rain may be 90%. Taking into account that the user generally prefers going on a tour on the Thames over a museum, two action may be provided with different scores. As an example, when the weather conditions are being taken into account, one action may be going to the museum with a score of 70% and another score may be going on a tour on the Thames with a score of 30%.

In some exemplary embodiments, a reinforcement learning model may be trained based on the states and on one or more actions. In some exemplary embodiments, a plurality of states may be obtained. In some exemplary embodiments, the states may be obtained from an existing dataset. Additionally or alternatively, the states may be generated by generating a plurality of valuations for each feature. For each state, a set of suggested actions may be determined by applying the plurality of policies on each state. In some exemplary embodiments, training the reinforcement learning model may comprise providing the plurality of states and corresponding suggested actions to the reinforcement learning model as a training dataset.

In some exemplary embodiments, a state may be generated by randomly generating values for features. Additionally or alternatively, an almost random strategy may be utilized. An almost random strategy may comprise generating values for features that are in within a range, generate states that are similar to pre-existing states, or the like.

In some exemplary embodiments, a reinforcement learning model may be trained based on actions having frequencies. In some exemplary embodiments, a frequency of an action may be the number of times that a policy yielded the action. In some exemplary embodiments, the frequency of an action may be relative. The relation may be with respect to the total number of actions that were given by a plurality of policies. As an example, a first action may be provided 12 times by 12 different policies. A second action may be provided 8 times by other policies. Similarly, a third action may be suggested two times. The first action may have a frequency of 12, the second action may have a frequency of 8 and the third action may have a frequency of 4. In some exemplary embodiments, as the total number of recommendations may be 24, the first action may have a relative frequency of 12/24 (e.g., approximately 0.5), the second action may have a relative frequency of 8/24 (i.e., approximately 0.33), and the third action may have a relative frequency of 4/24 (i.e., approximately, 0.16). In some exemplary embodiments, the relative frequency may be utilized as a score for training the reinforcement model.

In some exemplary embodiments, a reinforcement model may be trained based on actions having frequencies above a threshold, while actions having frequencies below the threshold may not be comprised by the training set of the reinforcement model. In such manner, outliers, anomalies, statistical errors, or the like, may be excluded from the training set. As an example, a recommendation system may utilize MDPs in order to build a training set comprising actions. An action may comprise going to a place of interest. One place of interest may be "Palace Restaurant" that is one of the worst restaurants in London according to TRIP-ADVISOR™. An action comprising "go to "Palace Restaurant"" may have a frequency of 1, 2, or the like while other actions may have a frequency that is above 10, above 20, or the like. By determining a threshold of 10, the above action may not be comprised by the training set, allowing better recommendations.

In some exemplary embodiments, the threshold may be relative, such as by training the reinforcement model based on actions having a frequency that is above 10% of the overall number of the total number of actions yielded by the plurality of policies. Referring to the example above, if the frequency of the third action is below the threshold, a score may be computed for each action out of the first and second actions. Although there are a total of 24 suggestions (12 first action, 8 second action and 4 third action), the score may be computed based on the sum of absolute frequencies of the actions that are being considered (e.g., the first action and the second action). In this example, the score of the first action may be 0.6 (12/20), and the second of the second action may be 0.4 (8/20).

Additionally or alternatively, other manners of computing a score based on the absolute frequencies, based on number of occurrences of an action as a suggestion by a policy, or the like, may be utilized. As an example, the score may perform normalization, be divided by a factor, a square root thereof may be taken, or the like.

In some exemplary embodiments, a Constraint Markov Decision Process (CMDP) may be used instead of MDP. Referring again to the recommendation system, a constraint may be a constraint on a recommended action, such as a user cannot travel in London in a speed that is more than 200 miles per hour. Additionally or alternatively, the constraint may be based on the preferences of the user. As an example, the user may dislike tea, or may be allergic to nuts. The recommendation may take such user-defined preferences in consideration using a constraint that the recommendation must hold.

In some exemplary embodiments, the reinforcement model may be a DRL model. In some exemplary embodiments, the DRL model may comprise an Artificial Neural Network (ANN) model, a Convolutional Neural Network (CNN) model, or the like.

One technical effect of utilizing the disclosed subject matter is an improvement in the computational complexity by applying MDP multiple times on a plurality of subsets instead of applying one MDP on one set. MDP complexity may be more than polynomial and in some practical applications may be exponential. By using the disclosed subject matter, the complexity may be reduced by an exponential factor. As an example, assuming that there are n features and that the complexity of MDP is exponential in the number of features, the complexity of applying a single MDP might require about $2^n$ computational steps. By using the disclosed subject matter, and by using m sets of n/m features each, the number of computational steps may be reduced to about $m \cdot 2^{n/m}$. For example, in case m=10 and n=100, this translates to 10,240 steps instead of 12,676,506,00,228,229,401, 496,703,205,376. It is further noted that the computational complexity may also vary depending on a cardinality of a domain of a feature. Hence, when the features have domains with a relatively large cardinality, the computational complexity may increase even further and the computational effect of the disclosed subject matter may be even more apparent.

Another technical effect of using the disclosed subject matter is a reduction in computational resources needed for generating training data for a DRL. In some exemplary embodiments, data for the DRL may generated by applying MDP. By using the disclosed subject matter, applying multiple MDPs on a plurality of projected datasets that projected on subsets of the features may require less componential resources compared to applying MDP on the full dataset.

Yet another technical effect of using the disclosed subject matter is a reduction in the execution time of preparing data for DRL. In some exemplary embodiments, applying MDP on a large dataset may require a couple of weeks, three weeks, a month, or the like. By using the disclosed subject matter, a few days may suffice or even less.

Yet another technical effect of using the disclosed subject matter is that a large dataset may be obtained. In some exemplary embodiments, there may be a large feature state spaces, DRL may require a substantial dataset for training purposes. As an example, there may be a large feature space in case of a recommendation system, when context information is used for features, as places, weather, points of interest in the surrounding of people, events, or the like. However, such a training dataset may not necessarily be available. In some exemplary embodiments, the disclosed subject matter may be utilized in order to generate states and determine scores thereof in an automated manner, and without having to utilize human labor in labeling good and bad states. A simulator for determining a score for a state may be utilized, even in case of states where the score cannot normally be extracted automatically. For example, as opposed to a game of chess, which may be randomly generated and a score may be determined based on the final result thereof, a recommendation engine may not have a straight forward simulator application. The disclosed subject matter may be utilized to overcome such shortcomings and provide a simulator with an automated scoring ability of states. In some exemplary embodiments, scored states may be generated much faster, and without requiring substantial resources compared to the time and resources needed for collecting states and scoring them.

It is noted that in some cases, it may be determined that the given training dataset is insufficient to train the DRL to meet a desired accuracy level, such as an accuracy level above a minimal threshold. In some exemplary embodiments, such determination may be due to the training dataset not covering all important feature states. In some exemplary embodiments, the DRL may be trained and its accuracy level may be determined after such training to determine whether additional training dataset is required, and is to be generated using the disclosed subject matter, or whether the DRL meets the minimal accuracy threshold.

Yet another technical effect of using the disclosed subject matter is scaling. In some exemplary embodiments, such as in cloud computing, it may be desired to execute a task on several machines instead of executing the task on a single machine. In such a case, as the required computational resources and execution time may grow, scaling the execution on more machines may reduce the required time. By using the disclosed subject matter, for each subset, or for each group of subsets, a dedicated machine or process may be allocated. As applying MDP on one subset is independent from applying MDP on a second subset, parallel computation may be performed. Parallel computation may be useful for efficiently scaling the operation.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Referring now to FIG. 1 showing a flowchart diagram of a method, in accordance with some exemplary embodiments of the disclosed subject matter.

On Step 110, a plurality of subsets of features may be determined. In some exemplary embodiments, the cardinality of the set of features may be 200, 300, 500, 1000, or the like. The cardinality of each subset of features may be 10, 20, 50, 90, or the like. In some exemplary embodiments, the cardinality of each subset may be less or equal to 10.

In some exemplary embodiments, the plurality subsets of features may be determined randomly, by selecting features randomly for each subset. Additionally or alternatively, similar features may be grouped. As an example, a recommendation system may be configured to recommend for a group of tourists places to go to. One subset of features may be the amount of money each member of the group has. Another set of features may be places that each member of the group may like to go to.

In some exemplary embodiments, different features may be of different domains having a different size, different cardinality, or the like. As an example, a first feature may be a binary feature such as the gender of a user. A second feature may be an integer such as a yearly income of the user. A third feature may be a categorical feature such as the occupation of the user. In such case, the domain of the first feature may be of size 2, the domain of the second feature may be of size $10^9$ and the domain of the third feature may be of size 200.

In some exemplary embodiments, each feature may be comprised by at least one subset. Additionally or alternatively, each feature may, on average, be comprised by at least two subsets, three subsets, or the like. In some exemplary embodiments, a method for extracting important features may be applied. The method may be Multifactor Dimensionality Reduction, Principal Components Analysis, or the like. It may be determined that important features should be comprised by more than one subset while non important features may be comprised by one subset.

In some exemplary embodiments, determining the subsets may comprise determining a number that is the size of each subset. Determining the size may comprise randomly choosing a number that is less than a tenth of the number of features such as the number of features divided by 5, divided by 8, or the like. Additionally or alternatively, a range for the size of each subset of features may be determined and the size of each subset of features may be randomly determined from within the range. Additionally or alternatively, the size of each subset may be a parameter provided by a designer of the system, a data scientist, or the like.

In some exemplary embodiments, once the size of each subset of features is determined, features for each subset may be determined randomly. Each feature may have an index. For each subset, integers may be randomly generated from within a range of indexes. For each subset, a set of integers having the size of the subset may be generated. For each generated integer, a feature having an index that is equal to the generated integer may be associated with the subset. In some exemplary embodiments, determining the subset may be repeated until the unification of all the subset is the set of features. It may be noted that such a process may provide subsets having a non empty intersection. It may be noted that the number of subsets may not be the minimal number of subsets. In case that there are n features and that the size of each subset is m, there may be more than n/m subsets. As an example, the number of features may be 100. The size of each subset may be 5. The index of one feature may be generated more than once for two different subsets, causing the number of subsets to be more than 20.

In some exemplary embodiments, determining the subsets may comprise defining a set of candidate features. The set of candidate features may initially comprise all features, and a feature may be selected randomly therefrom. After the selection of a feature, that feature may be removed from the set of candidate features.

In some exemplary embodiments, determining the subsets may be performed by a combination of the above, such as generating m1 subsets while potentially reselecting the same features, and generating m2 subsets while removing from the candidate sets each selected feature.

In some exemplary embodiments, determining the subsets may be performed by generating m1 subsets while potentially reselecting the same features. After m1 subsets are generated, it may be determined whether the m1 subsets meet all desired criteria, such as sufficient coverage of the features (e.g., each feature appearing once, each feature appearing twice, each important feature appearing twice, or the like). If the m1 subsets do not meet the desired criteria, additional subsets may be generated in a manner ensuring the criteria is met. For example, any feature that does not appear a sufficient number of times in the subsets may be selected explicitly and without relying on probabilities for its selection. As an example, the set of features that do not appear a sufficient number of times may be created, and subsets may be created therefrom, while excluding each selected feature after being selected. The additional m2 subsets that may be created may be added to the m1 subsets.

On Step 120, for each subset, a policy may be determined. Determining the policy may comprise applying an MDP with respect to the subset. In some exemplary embodiments, an MDP may be a 3-tuple (S, A, P), where S may denote a finite set of states, A may denote a finite set of actions, $P_a(s, s')=P_r(s_{t+1}=s'|s_t=s, a_t=a)$ may denote the probability that action in state s at time t will lead to state s' at time t+1.

In some exemplary embodiments, an MDP may be a 4-tuple (S, A, P, R), where R denotes a reward. $R_a(s, s')$ may be an immediate reward received after transitioning from state s to state s' due to action a. In some exemplary embodiments, the reward may be based on the score of action a with respect to state s.

In some exemplary embodiments, a state transition matrix $T_i$ may be determined in order to apply MDP on a vector of valuation of features. In some exemplary embodiments, there may not enough transitions, actions, or the like. Methods for iterating over neighbor states, such as the methods disclosed in Zadorojniy, Alexander, Adam Shwartz, Segev Wasserkrug, and Sergey Zeltyn "Operational optimization of wastewater treatment plants: A CMDP based decomposition approach" Annals of Operations Research (2016): 1-18 and in Patent Application Publication US 2017/0068897A1, filed Sep. 9, 2015, entitled "INTERPOLATION OF TRANSITION PROBABILITY VALUES IN MARKOV DECISION PROCESSES", both of which are hereby incorporated by reference in their entirety for all purposes, may be applied.

In some exemplary embodiments, a plurality of states may be obtained. Each state of the plurality of states may comprise a valuation of the features. A projection of each state to the subset may be computed. Applying MDP on a subset may yield a policy, $\pi_j$, for the subset. In some exemplary embodiments, a policy may comprise a function that defines an action for a state ($\pi_i$: S→A). By applying MDP on each subset a plurality of policies may be obtained, each of which potentially defining a different action for a state. It is noted that each policy may be applied on a state that is based on a different subset of features, e.g., a projection of the original state on a different subset of features.

On Step 130, a state may be obtained. The state may have a valuation for each feature comprised by the set of features.

In some exemplary embodiments, there may be a need for a large number of states, such as over a million, over 5 million, or the like and corresponding scores, in order to train a DRL. In case that there are not enough states available, a state may be generated. The state may be generated by randomly choosing a valuation for each feature. Additionally or alternatively, the state may be generated by randomly generating random valuation for each state within a contextual constraints, such as using a Constraint Satisfaction Problem (CSP) solver. Additionally or alternatively, the state may be generated by randomly choosing a valuation for a feature within a proximity to an observed value of the feature. In some exemplary embodiments, the observed value of the feature may be a value of the feature that was obtained in production environment. A proximity may refer to a distance from the observed value to the generated value, wherein the distance is below a threshold.

On Step 140, each policy that was determined on Step 120 may be applied on the state, yielding a plurality of suggested actions for the state. The state may be projected to different subsets, each of which being introduced to the relevant policy to determine a suggested action based thereon. As an example, state s may be projected to subsets $f_1, f_2, \ldots, f_n$, resulting in $s_1, s_2 \ldots, s_n$ abstractions thereof, each of which consisting a strict subset of the features of the original state s. The set of actions may be $\pi_1(s_1), \pi_2(s_2) \ldots \pi_n(s_n)$. In some exemplary embodiments, a suggested action may be suggested by several different policies.

On Step 150, a set of actions and corresponding scores may be determined for the state. The actions may be selected based on the suggested actions obtained on Step 140. Additionally or alternatively, the score may be computed based on the suggestions provided on Step 140. In some exemplary embodiments, the score may be the absolute frequency of the suggested action divided by the total number of suggested actions. In some exemplary embodiments, the score may be computed while disregarding suggested actions that are considered irregular and are observed below a predetermined threshold. In some exemplary embodiments, $F_a$ may denote the frequency of a suggested action. A may denote the set of suggested action. The score for state s and action a may be computed as $$\frac{F_a}{\Sigma F_a}.$$

In some exemplary embodiments, A' may denote a set comprising suggested actions having a frequency that is above a threshold R. Formally, for any a ∈A, A'={a|$F_a$≥R}. In some exemplary embodiments, a score for an action may be determined based on A'. The score for state s and action a may be computed as $$\frac{F_a}{\Sigma_{\forall a' \in A'} F_{a'}}.$$

In some exemplary embodiments, in case that |A'|=0, R may be reduced, and A' may be recomputed. R may be reduced by 2%, 5%, or the like. Reducing the threshold may be performed repeatedly until the size of A' is above a desired threshold, t. In some exemplary embodiments, a supremum on the number of reductions, may be determined. Performing many reductions may lead to a dataset of poor quality, such as a dataset comprising actions having a low frequency. In some exemplary embodiments, in case that a training data set having a size above t was not determined, a notification to a user may be provided and the user may repeat Steps 110-150, in case that determining the subsets of features led to the above problem. Additionally or alternatively, the user may repeat Steps 130-150. Additionally or alternatively, the notification may be provided to a computerized environment executing the method of FIG. 1 and Steps 110-150 or Steps 130-150 may be repeated.

In some exemplary embodiments, Steps 130-150 may embody a simulator. A simulator may be a method, a module, or the like, configured to generate states and corresponding action and scores.

In some exemplary embodiments, the provided scores of the actions may yield a probability distribution of actions for a state, where the probability distribution is based on the policies determined using MDP.

On Step 160, a reinforcement model may be trained. The reinforcement model may be trained based on the state and on the one or more actions. Additionally or alternatively, the reinforcement model may be trained based a probability distribution of actions for the state. In some exemplary embodiments, the model may by a deep learning model, DRL model, or the like. In some exemplary embodiments, for each state, a probability $P_a$ of an associated action may be provided to the reinforcement model. In some exemplary embodiments, $P_a$ may be the score of the action for the state. Additionally or alternatively, in case the action a is not in A', $P_a$ may be set to zero.

In some exemplary embodiments, a large training dataset may be required in order to train the model. In order to obtain such training set, steps 130-150 may be repeated.

In some exemplary embodiments a naïve approach for generating states may be applied. As an example, in case that the reinforcement model utilized to determine a move in a Board games such as Chess or Go, the game may be simulated and scoring may be determined based on the success of the player that took the action. However, in some case such as in a real life recommendation system, in a video game, or the like, such naïve approach may not be applicable, as there may not be any way to determine which action was successful and which was not. In that case, Steps 130-150 may be performed repeatedly to provide for an approximated score of different actions for different state, in an automated manner.

On Step 170, a new state may be obtained. The new state may comprise valuations for each feature in the set of features. In some exemplary embodiments, the new state may be obtained in a production environment such as obtained by a mobile device of a user. Additionally or alternatively, the new state may be obtained in a testing environment.

On Step 180, an action for the new state may be determined. The action may be determined by providing the new state to the reinforcement model. In some exemplary embodiments, the action may be determined without applying the policies that were determined using the MDP on Step 120, and based solely on the reinforcement model.

In some exemplary embodiments, Steps 180-190 may be repeated. Steps 170-180 may be repeated as the reinforcement model is being used in a testing environment, obtaining new states, applying the model thereon and assessing the model. Additionally or alternatively, steps 180-190 may be repeated by agents using the reinforcement model in order to determine an action.

Figure 2A:
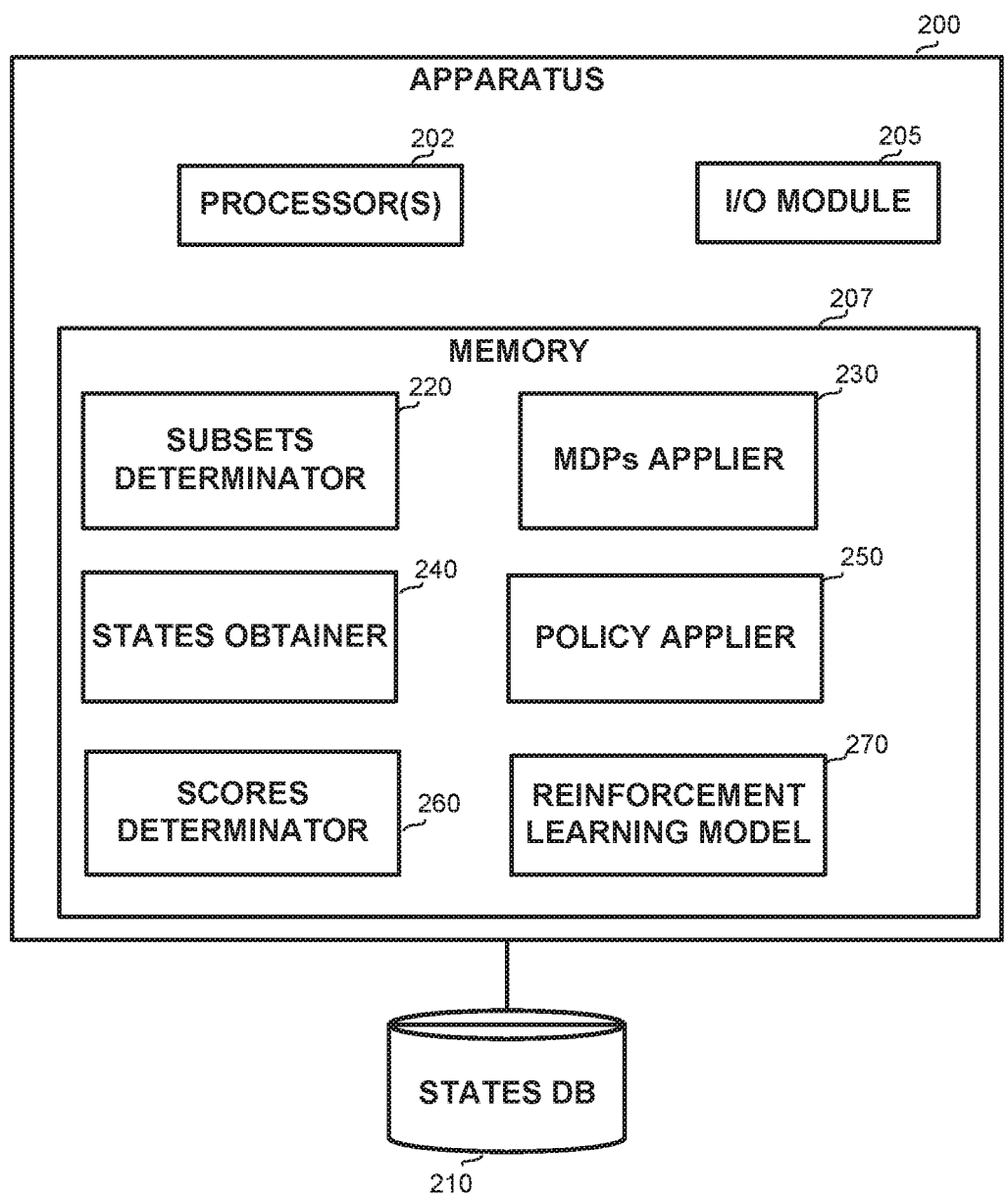
FIG. 2A shows a block diagram of an apparatus, in accordance with some exemplary embodiments of the disclosed subject matter.

Referring now to FIG. 2A showing a block diagram of an apparatus, in accordance with some exemplary embodiments of the disclosed subject matter.

In some exemplary embodiments, Apparatus 200 may comprise one or more Processor(s) 202. Processor 202 may be a Central Processing Unit (CPU), a microprocessor, an electronic circuit, an Integrated Circuit (IC) or the like. Processor 202 may be utilized to perform computations required by Apparatus 200 or any of it subcomponents.

In some exemplary embodiments of the disclosed subject matter, Apparatus 200 may comprise an Input/Output (I/O) module 205. I/O Module 205 may be utilized to obtain a set of features, to obtain states, or the like. Additionally or alternatively, I/O Module 205 may be utilized to provide an action for a state.

In some exemplary embodiments, Apparatus 200 may comprise Memory 207. Memory 207 may be a hard disk drive, a Flash disk, a Random Access Memory (RAM), a memory chip, or the like. In some exemplary embodiments, Memory 207 may retain program code operative to cause Processor 202 to perform acts associated with any of the subcomponents of Apparatus 200.

Memory 207 may comprise one or more components as detailed below, implemented as executables, libraries, static libraries, functions, or any other executable components.

In some exemplary embodiments, Subsets Determinator 220 may be configured to determine subsets of features. The subsets may be determined by randomly dividing the set features. In some exemplary embodiments, the set of features may comprise more than 100 features while each subset may comprise 10 features, 20 features, or the like. In some exemplary embodiments, each subset may comprise less than 100 features.

In some exemplary embodiments, MDPs Applier 230 may be configured to apply an MDP on a subset of features. Applying the MDP on a subset of features may yield a policy. In some exemplary embodiments, MDPs Applier 230 may apply an MDP on each subset of features, resulting in a plurality of policies.

In some exemplary embodiments, States Obtainer 240 may be configured to obtain a state. States Obtainer 240 may obtain a state from A States Database 210. Additionally or alternatively, States Obtainer 240 may be configured to generate a state. In some exemplary embodiments, a state may be generated randomly, by randomly selecting a valuation for each feature. Additionally or alternatively, States Obtainer 240 may be configured to generate a state in an almost random manner, randomly selecting a value for each feature under a set of constraints. As an example, a feature may represent the amount of money that a user is having in his wallet. It may desired to generate a random value between 0 and 1000 instead of generating a float random value.

In some exemplary embodiments, Policy Applier 250 may be configured to apply a policy on a state. A policy may be a function defining an action for a state. By applying the plurality of policies that may have been determined by MDPs Applier 230 on a state that may have been obtained by States Obtainer 240, a plurality of suggested actions for the state may be determined. Each policy may be applied on a different portion of the state comprising the values of the features within the corresponding subset of features.

In some exemplary embodiments, Scores Determinator 260 may be configured to determine a score for each suggested action for a state. In some exemplary embodiments, each suggested action may have a corresponding score with respect to a state. In some exemplary embodiments, a score may be the frequency of the suggested action in the plurality of suggested actions, provided by the different policies with respect to the state. In some exemplary embodiments, the score may be a ratio between the number of suggested actions for the state that are being considered and the number of times the action was suggested.

In some exemplary embodiments, Reinforcement Model 270 may be configured to determine an action for a state. In some exemplary embodiments, Reinforcement Model 270 may be trained using states, corresponding actions and corresponding scores. In some exemplary embodiments, once trained, Reinforcement Model 70 may be configured to determine an action for a new state, without utilizing MDPs Applier 230, policies determined by an MDP, or the like.

In some exemplary embodiments, Reinforcement Model 270 may be external to Apparatus 200. Apparatus 200 may be utilized to prepare training data for a model. Different computerized environment may utilize instances of Apparatus 200 in order to train the model for specific needs and use cases.

Figure 2B:
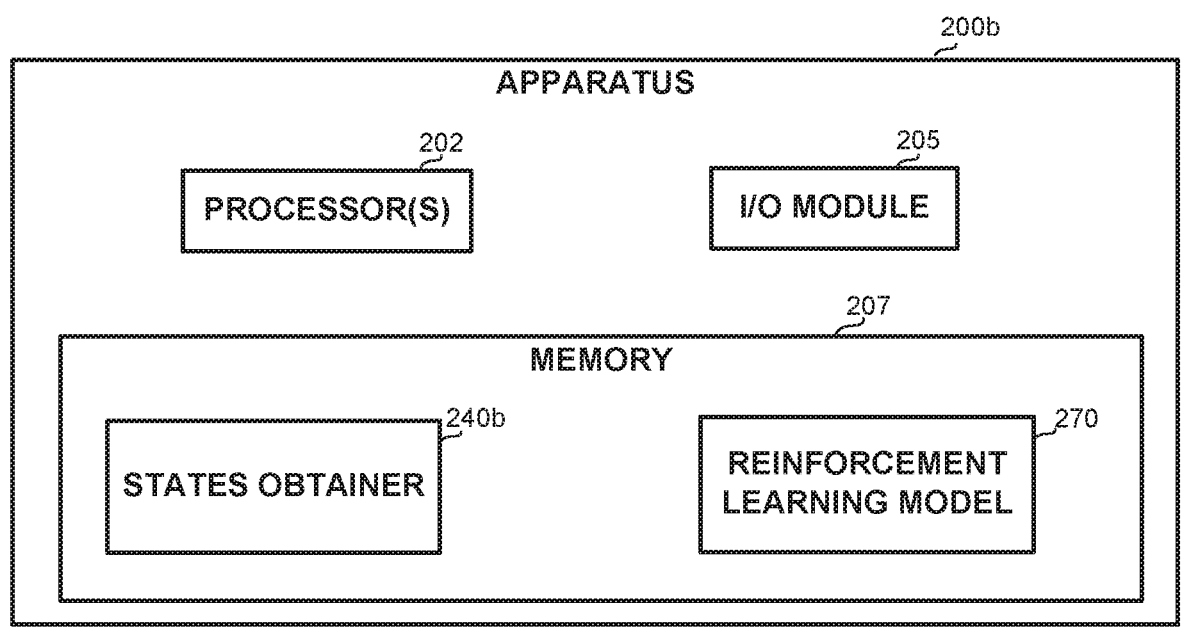
FIG. 2B shows a block diagram of an apparatus, in accordance with some exemplary embodiments of the disclosed subject matter.

Referring now to FIG. 2B showing a block diagram of an apparatus, in accordance with some exemplary embodiments of the disclosed subject matter.

In some exemplary embodiments, Apparatus 200b may be configured to provide an action for a state. In some exemplary embodiments, Apparatus 200b may be configured to provide an action for a state without using an MDP, solely based on a trained model, such as Reinforcement Learning Model 270.

In some exemplary embodiments, States Obtainer 240b may be configured to obtain a state. The state may be a real state, a production state, or the like. As an example, Apparatus 200b may be utilized by a recommendation system configured to output recommended trips for a user. Apparatus 200b may be installed on a mobile device of the user.

A valuations for a feature comprised by the state may be obtained by using the mobile device sensors.

In some exemplary embodiments, Reinforcement Learning Model 270 may be configured to provide an action based on the obtained state. In some exemplary embodiments, Reinforcement Learning Model 270 may be configured to keep learning based on newly obtained states in order to improve the accuracy of the action provided thereby.

In some exemplary embodiments, Reinforcement Learning Model 270 may be the result of the learning operation of Reinforcement Learning Model 270 of FIG. 2A.

Figure 3:
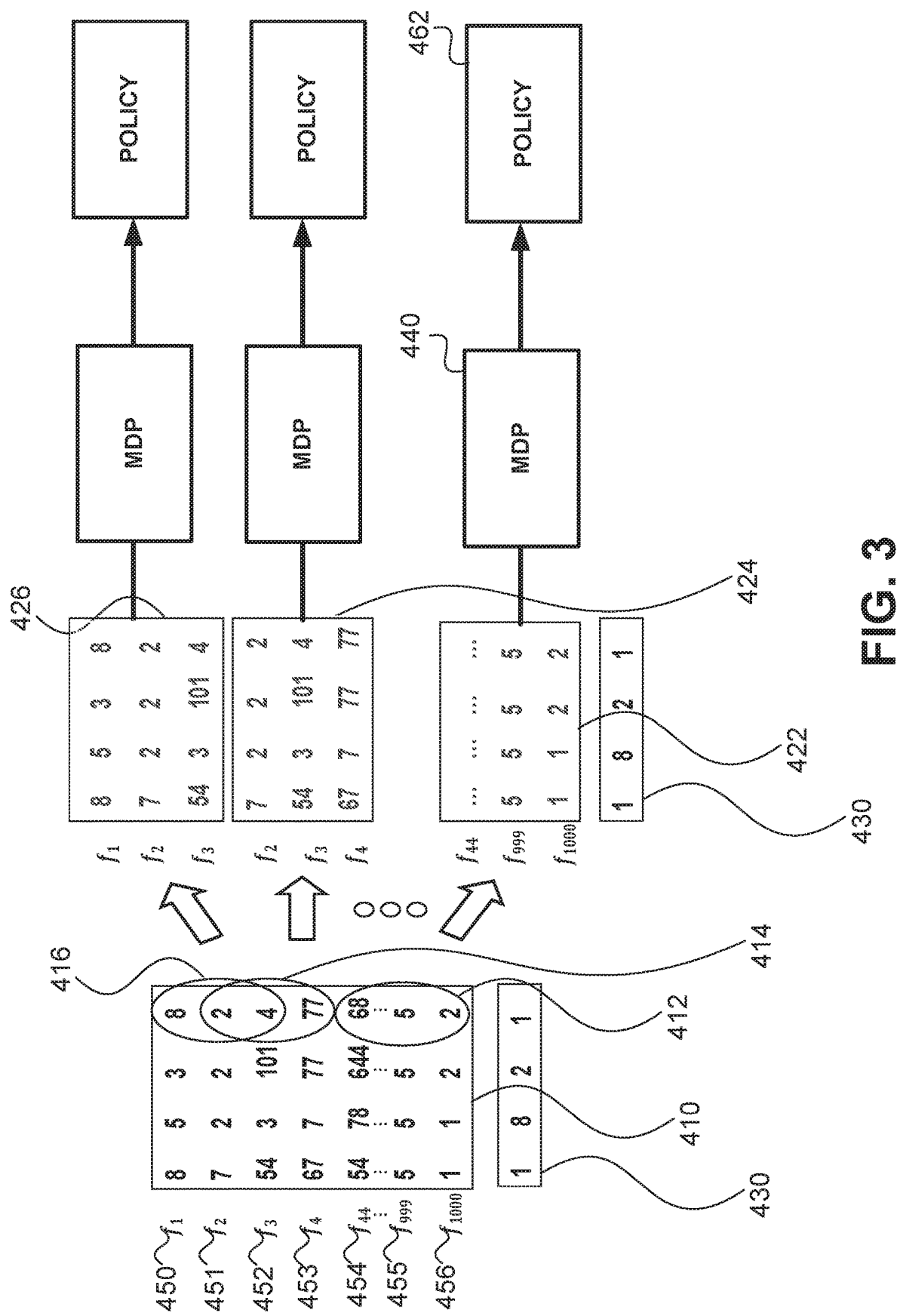
FIG. 3 shows a schematic illustration of showing a schematic illustration of Steps 110 and 120 of FIG. 1, in accordance with some exemplary embodiments of the disclosed subject matter.

Referring now to FIG. 3, showing a schematic illustration of Steps 110 and 120 of FIG. 1, in accordance with some exemplary embodiments of the disclosed subject matter.

In some exemplary embodiments, a Table 410 may illustrates features having valuations. As can be seen, there may be 1000 features. In some exemplary embodiments, there may be any number of features.

In some exemplary embodiments, different subsets of the features may be determined. Subset 426 may comprise Features 450, 451, 452. Projection 416 may be a projection of a state in Table 410 onto Subset 426. In some exemplary embodiments, Subset 424 may comprise Features 451, 452, 453. As can be appreciated, Features 451, 452 may be comprised by both Subset 426 and Subset 424. In some exemplary embodiments, Projection 414 may be projection of the state in Table 410 onto Subset 424.

In some exemplary embodiments, a Projection 412 may be a projection of the state onto Subset 422, which comprises Features 454, 455, 456. As can be appreciated, projections of features to subsets may not follow indexes as Subset 422 may not comprise a feature with index 998 (not shown).

A History of Actions 430 may illustrate actions taken corresponding the states. As an example, the state which is projected by Projections 412, 414, 416 corresponds the action denoted as "1". In some exemplary embodiments, there may be any number of actions. In some exemplary embodiments, an action may have any value such as a string, a float, or the like.

In some exemplary embodiments, each subset may be processed by an MDP, separately and independently. Each Subset, potentially together with History of Actions 430 may be processed to determine a corresponding policy thereof. As an example, MDP 440 may be applied on Subset 422 to obtain Policy 462 thereof. The policy may be a function providing an action to be taken given a valuation of the corresponding subset of features (e.g., projection of a state onto the subset of features). It is noted that the same MDP may be applied on different subsets to yield potentially different policies.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   determining a plurality of subsets of features, each of which is a subset of a set of features, whereby obtaining a plurality of different subsets of the set of features;
   for each subset of features of the plurality of subsets of features, determining a policy, wherein the policy is a function defining an action based on valuation of the subset of features, wherein the policy is determined using a Markov Decision Process (MDP), whereby obtaining a plurality of policies;
   obtaining a state, wherein the state comprises a valuation of each feature of the set of features;
   applying the plurality of policies on the state, whereby obtaining a plurality of suggested actions for the state, based on different projections of the state onto different subsets of features;
   determining, for the state, one or more actions and corresponding scores thereof based on the plurality of suggested actions, wherein said determining, for the state, the one or more actions and corresponding scores thereof comprises; determining a frequency for an action based on the plurality of suggested actions, wherein a corresponding score of the action in determined based on the frequency; and
   training a reinforcement learning model using the state and the one or more actions and corresponding scores thereof.

2. The method of claim 1, wherein said obtaining the state comprises generating the state by generating the valuation of at least a portion of the set of features.

3. The method of claim 1, wherein said obtaining the state and said determining for the state are performed a plurality of times for different states in a training dataset, wherein said training is performed using the training dataset.

4. The method of claim 1, wherein said training is performed using a portion of the one or more actions, each of which having a corresponding frequency above a threshold.

5. The method of claim 1, wherein the reinforcement learning model is a deep reinforcement learning model.

6. The method of claim 1 further comprises: obtaining a new state; and applying the reinforcement learning model to determine an action for the new state.

7. The method of claim 6, wherein said applying the reinforcement learning model is performed without consulting with the plurality of policies.

8. The method of claim 1, wherein said determining the plurality of subsets of features comprises randomly determining the subsets of features.

9. The method of claim 1, wherein a unification of the plurality of subsets of features comprises all features of the set of features.

10. The method of claim 1, wherein the reinforcement learning model is configured to provide a recommendation action for a state representing information about a user.

11. The method of claim 1, wherein the MDP is a Constrained MDP (CMDP).

12. A computerized apparatus having a processor and coupled memory, the processor being adapted to perform the steps of:
   determining a plurality of subsets of features, each of which is a subset of a set of features, whereby obtaining a plurality of different subsets of the set of features, wherein a cardinality of the set of features is greater than two hundred, wherein a cardinality of each subset in the plurality of subsets of features is greater than ten and smaller than a hundred;

for each subset of features of the plurality of subsets of features, determining a policy, wherein the policy is a function defining an action based on valuation of the subset of features, wherein the policy is determined using a Markov Decision Process (MDP), whereby obtaining a plurality of policies;

obtaining a state, wherein the state comprises a valuation of each feature of the set of features;

applying the plurality of policies on the state, whereby obtaining a plurality of suggested actions for the state, based on different projections of the state onto different subsets of features;

determining, for the state, one or more actions and corresponding scores thereof based on the plurality of suggested actions; and training a reinforcement learning model using the state and the one or more actions and corresponding scores thereof.

13. A computer program product comprising a non-transitory computer readable storage medium retaining program instructions, which program instructions when read by a processor, cause the processor to perform:

determining a plurality of subsets of features, each of which is a subset of a set of features, whereby obtaining a plurality of different subsets of the set of features;

for each subset of features of the plurality of subsets of features, determining a policy, wherein the policy is a function defining an action based on valuation of the subset of features, wherein the policy is determined using a Markov Decision Process (MDP), whereby obtaining a plurality of policies;

obtaining a state, wherein the state comprises a valuation of each feature of the set of features;

applying the plurality of policies on the state, whereby obtaining a plurality of suggested actions for the state, based on different projections of the state onto different subsets of features;

determining, for the state, one or more actions and corresponding scores thereof based on the plurality of suggested actions, wherein said determining, for the state, the one or more actions and corresponding scores thereof comprises: determining a frequency for an action based on the plurality of suggested actions, wherein a corresponding score of the action is determined based on the frequency; and training a reinforcement learning model using the state and the one or more actions and corresponding scores thereof.

14. The computer program product of claim 13, wherein said obtaining the state comprises generating the state by generating the valuation of at least a portion of the set of features.

15. The computer program product of claim 13, wherein said obtaining the state and said determining for the state are performed a plurality of times for different states in a training dataset, wherein said training is performed using the training dataset.

16. The computer program product of claim 13 further comprises: obtaining a new state; and applying the reinforcement learning model to determine an action for the new state.

* * * * *